Dec. 1, 1931.  A. A. REID  1,834,254
AIRCRAFT
Filed Jan. 23, 1931   2 Sheets-Sheet 2
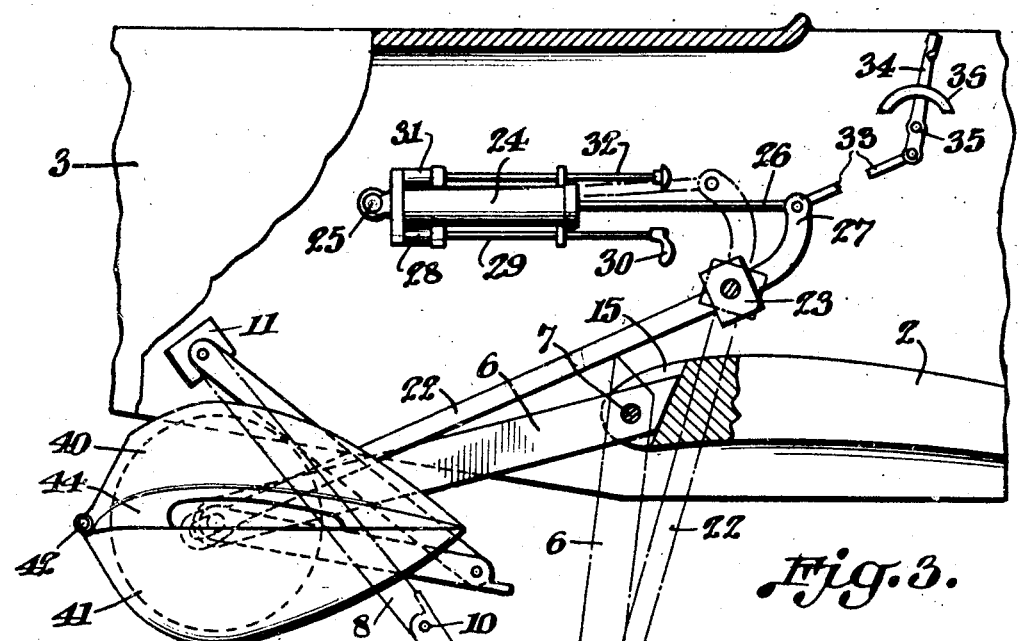
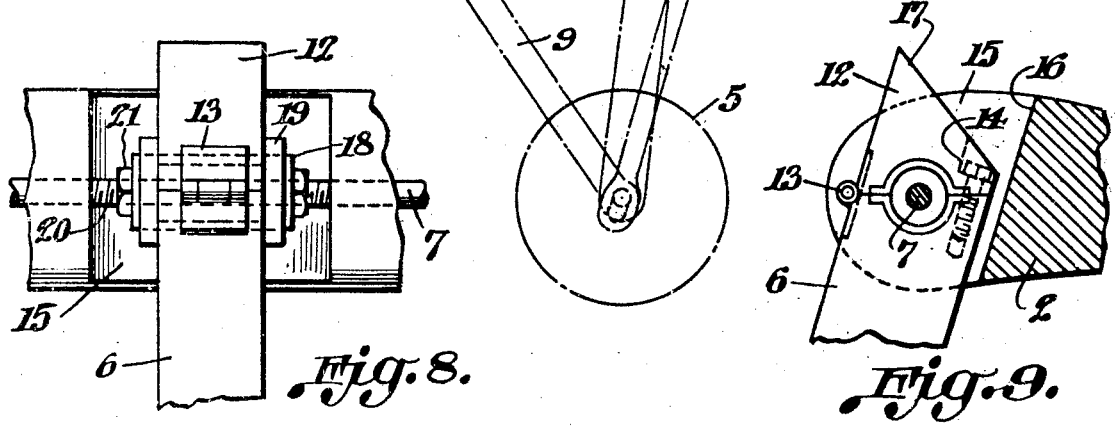
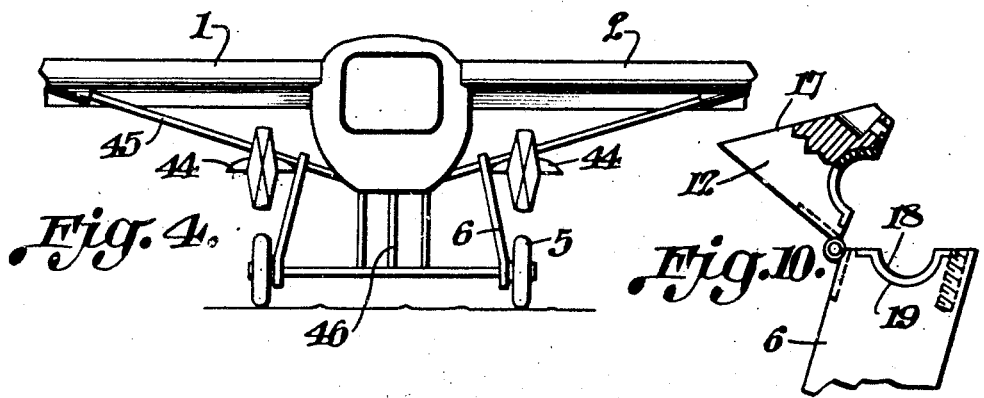
Inventor:
Arthur A. Reid
by Raymond Jones
Atty.

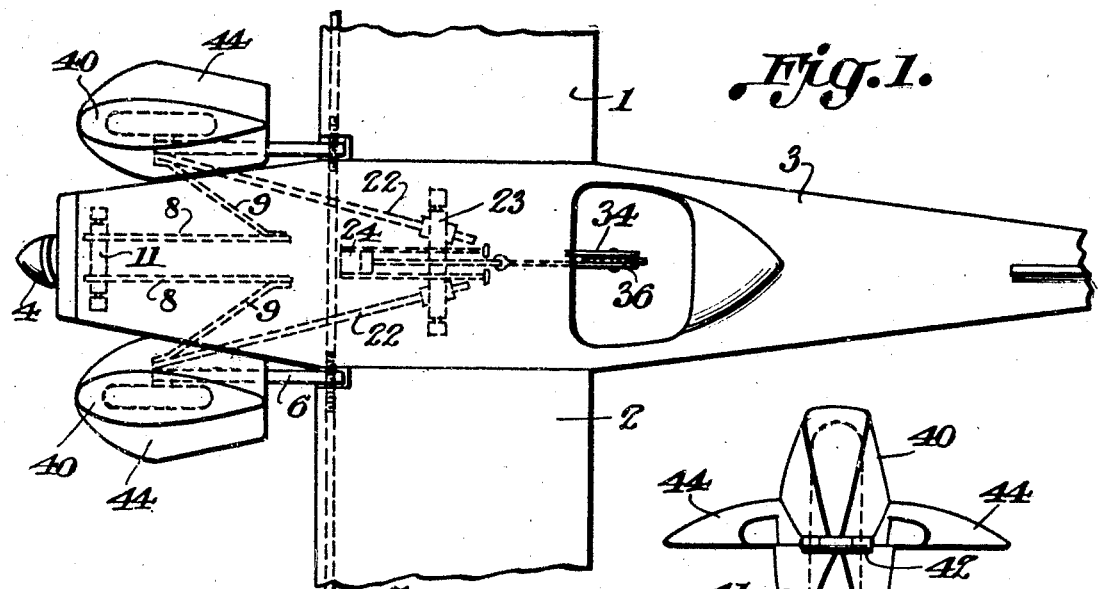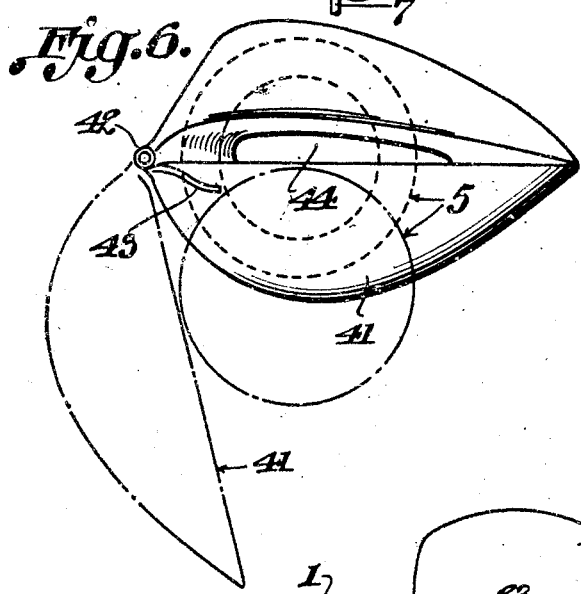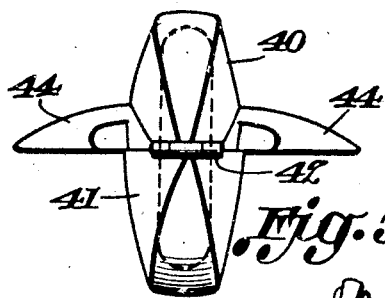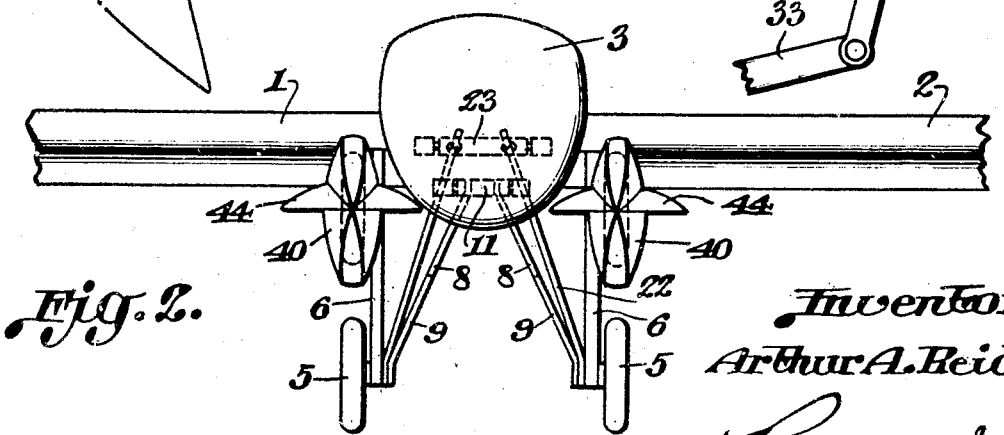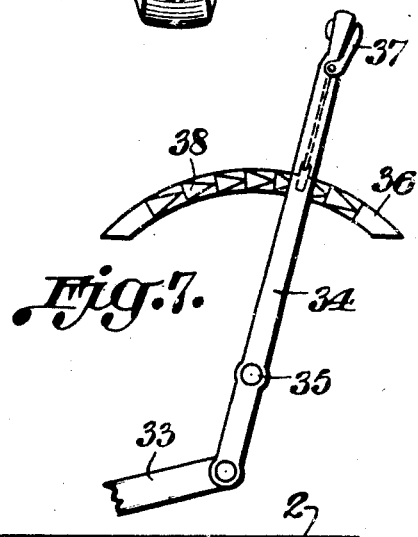

Patented Dec. 1, 1931

1,834,254

UNITED STATES PATENT OFFICE

ARTHUR ABNER REID, OF DICKSON, PENNSYLVANIA

AIRCRAFT

Application filed January 23, 1931. Serial No. 510,799.

This invention relates to aircraft and, more specifically, to an improved landing gear of the retractible type having for its principal object to provide a landing gear that may be quickly and easily retracted to a folded position adjacent the fuselage of an airplane while the latter is in flight.

Another object is to provide a landing gear that may be retracted to a position whereby the head resistance offered to forward travel of an airplane is reduced to a minimum.

Another object is to provide a landing gear which is pivotally supported directly upon a main transverse wing spar.

Another object is to provide a hydraulic or pneumatic power means arranged to permit an easy and rapid retraction of the landing gear, but which will permit a quick return of the gear to normal position.

A further object is to provide a novel and effective air shield associated with the ground wheels in a raised position, which shield is so formed as to afford a maximum of lifting effort under full speed sufficient to offset the weight of the landing gear.

A still further object is to provide a landing gear which is simple and economical to manufacture, easy to install and operate, and which is strong and durable in construction.

Other objects and advantages will become apparent from the specification which follows and from the drawings wherein,—

Figure 1 is a plan view of a monoplane equipped with my improved landing gear and showing the gear in its retracted position;

Fig. 2 is a front elevation of a low wing monoplane showing the gear in its normal or lowered position;

Fig. 3 is a fragmentary view showing the landing gear and operating parts in two extreme positions;

Fig. 4 is a modification showing a retractible landing gear applied to a high wing monoplane provided with the novel wind shield;

Figs. 5 and 6 are enlarged detail views of my improved wind shield showing the integral lifting wings;

Fig. 7 is a detail view of an operating lever; and

Figs. 8 to 10 are detail views showing a means for detachably connecting the landing gear to a wing spar.

Referring to the drawings in detail, I have shown in conventional form a monoplane provided with wings 1 and 2, a fuselage 3, and a propeller 4. The ground wheels 5 are mounted upon the lower ends of the main vertical bars 6 which, in turn, are rotatably supported upon the wing spar 7. A pair of tension members 8 and 9 are pivoted together by a pin 10 and are pivotally connected, respectively, at the upper end to a pivoted block 11 located adjacent the front end of the fuselage, and at the lower end adjacent the lower end of the bar 6.

In order to provide a detachable connection between the bars 6 and spar 7, the upper end of each bar is formed as a cap 12 pivotally mounted by a hinge 13, and a threaded bolt 14 is provided to lock the cap to the bar 6. It will be noted, particularly in Figs. 8 and 9, that the front edge of each wing is recessed as at 15 to expose the spar 7 and the rear wall 16 of each recess is formed on a slope to not only serve as a stream line form, but also to fit closely adjacent the slope 17 of the cap when the bar 6 is horizontal.

A split sleeve 18 is positioned between the bar 6 and the spar 7 to loosely surround the spar and a pair of split clamping rings 19 tightly engage opposite ends of the sleeve. In order to provide for a limited lateral adjustment of the bars 6 along the spar 7, the latter is threaded as at 20 and a pair of lock nuts 21 serve to retain each bar in an adjusted position.

The means for operating the landing gear to a retracted position comprises a pair of rods 22 secured at the lower ends to the lower ends of the bars 6 and at the upper ends rigidly to a block 23 which is pivotally mounted within the fuselage. A power device, such as a hydraulic jack 24, is pivotally mounted within the fuselage as by pivot 25. A piston operated rod 26 is pivotally connected to a bar 27 which, in turn, is rigidly connected to the block 23. A pump 28 and a plunger 29 serve to actuate the piston of the hydraulic device and the handle 30 of the plunger is located within reach of the pilot. An unloading valve 31 is controlled by the rod 32 and serves to permit a return of the hydraulic piston when the landing gear is dropped to its normal ground position.

A manually controlled rod 33 is pivoted to the bar 27 at one end and to a hand lever 34 which is mounted on a shaft 35. An arcuate rack 36 cooperates with the lever 34 and detent 37 to lock the lever in any desired position. The rack teeth 38 are so formed as to permit the lever 34 to move freely to the left in Fig. 7 during the retraction of the landing gear, but prevent movement of the lever to the right unless the detent 37 is raised.

The streamline wind shields 40 are mounted at opposite sides of the nose of the fuselage on a level substantially with the lower portion of the fuselage and wings and the wind shields are attached to the fuselage in any desired manner, for example, as shown in my prior Patent No. 1,743,393, issued January 14, 1930. Each shield is fully streamlined along every line of air flow as shown in detail in Figs. 5 and 6. The lower half 41 of each shield is pivoted as at 42 and is provided with an extension 43 which projects in a position to be engaged by a wheel 5, whereby the lower half of the shield is automatically closed by impact of the wheel.

An important feature of my invention relates to the provision of a pair of laterally extending wings 44 which are mounted on the upper half of each shield. These wings, as shown in Fig. 6 in side elevation, are of aerofoil contour and provide a maximum of lift which, when the airplane is travelling at full speed, is sufficient to completely offset the weight of the entire landing gear and for a purpose to be described later.

Fig. 4 shows a high wing monoplane, wherein the landing gear is supported mainly from the struts 45 and operated to a retracted position by means of a control rod 46 in a manner similar to that in my Patent 1,743,393 referred to. This view, however, shows my improved shields as provided with aerofoil wings 44.

In the operation of my device and referring to Fig. 3, when the airplane is taking off, the landing gear is in its lowered position as shown in dotted lines. One component of the force acting on the wheels is exerted rearwardly on the wheel axles and is resisted by the tension bars 8 and 9 and, in part, through control rod 22 which is locked against movement upwardly by means of the lever 34 and its detent 37.

As soon as sufficient speed of the airplane is obtained, the pilot operates the pump rod 29 whereby the piston rod 26 is moved to the right to its full line position to rotate the rod 22 clockwise about the center of rotation of the block 23. During this movement, the lever 34 slides over the rack teeth 38, and the main bars 6 are rotated clockwise until the wheels 5 are positioned within their respective shields.

When it is desired to lower the landing gear, the pilot operates valve rod 32 and the unloading valve 31 is opened to permit the hydraulic piston to move to the left to permit the wheels to lower. Since the device 24 is pivoted at 25, it may swing up or down to permit the piston rod 26 to assume extreme positions without any binding action. The lever 34 may be employed in any emergency to assist in raising or lowering the landing gear.

While I have shown a conventional hydraulic device at 24, it is to be understood that any fluid type of motor may be employed, or I may provide a fluid pressure tank to operate the piston in lieu of a hand pump.

It will be noted in Fig. 1, that the major portion of the weight of the landing gear in retracted position is located in advance of the wings 1 and 2. By providing the aerofoils 44 on each shield 40, I obtain an additional lifting force which is exerted at the proper time in a position to offset the weight of the landing gear. In the event of stalling of the motor, the propeller blast is not effective to create a vacuum over the main wings and the lifting effect of the auxiliary aerofoils becomes effective to stabilize the airplane about its transverse axis. At decreased speeds, the lifting effect of the aerofoils 44 is decreased and the weight of the landing gear is again exerted forward of the center of lift, whereby that weight is effective to stabilize about the transverse axis.

From the foregoing description, it will be seen that I have not only provided a retractible gear which is simple in construction and easy to install and operate, but also have provided a novel and effective streamline wind shield carrying aerofoils which cooperate with the landing gear in a new and useful manner to produce operating characteristics never before obtained and which are very desirable in improving the performance of heavier than air craft.

With the enormous speeds even at the present time, it becomes apparent that a retractible landing gear is most effective to reduce head resistance to flight and improve the performance of airplanes. My invention is adapted to provide a more effective control of airplanes, particularly at such high speeds, and that control is secured automatically by means of the relative arrangement and design of the parts described.

What I claim is:—

1. In an aircraft comprising wings and a fuselage, a transverse wing spar positioned within the leading edge of said wings, a retractible landing gear comprising main vertical supports, said supports being pivotally mounted at their upper ends on said spar, and means for displacing said landing gear forwardly and upwardly to a position adjacent said fuselage and in advance of the leading edge of said wings.

2. In an aircraft comprising wings and a fuselage, a retractible landing gear comprising main vertical supports, means for pivotally mounting said supports at their upper ends on said wings adjacent the leading edge thereof, and means for displacing said landing gear forwardly and upwardly to a position adjacent said fuselage with said vertical supports forward of and substantially in the plane of said wings.

3. In an aircraft comprising wings and a fuselage, a transverse wing spar within the leading edge of said wing, a landing gear comprising main vertical supports, means for pivotally mounting said landing gear on said wing spar a recess in said leading edge adjacent said pivotal mount, said support being movable forwardly and upwardly within said recess to a position in the horizontal plane of said wings.

4. In an aircraft comprising wings and a fuselage, a retractible landing gear pivotally associated with said aircraft and movably forwardly about a transverse axis, a rod pivotally mounted on said fuselage and connected to said landing gear, a fluid pressure device in said fuselage, means connected to said device and to said rod for retracting the latter to a folded position adjacent said fuselage, an operating lever pivotally connected to said rod, and detent means for said lever permitting movement of said gear to a retracted position at all times and operable to releasably lock said gear in a retracted position.

5. In an aircraft comprising wings and a fuselage, a retractible landing gear pivotally associated with said aircraft, a fluid pressure device in said fuselage and connected to said landing gear, a control lever pivoted to said fuselage, means connecting said lever to said landing gear, said landing gear being selectively operable to a retracted position by said device or by said lever.

6. In an aircraft in combination, a fuselage, a landing wheel, a wind shield associated with said landing wheel, a cantilever lifting aerofoil mounted on said shield and extending laterally therefrom the incidence of said aerofoil being fixed to provide a vertical lift on said shield.

7. In an aircraft, a streamline wind shield, a member to be shielded thereby from air currents, a lifting aerofoil mounted entirely on said shield and providing an upward lift exerted on said shield substantially equal to the weight of said member with the aircraft at normal speed.

8. In an aircraft in combination, a fuselage, a landing gear pivotally mounted on said aircraft and including a ground wheel, a wind shield supported on said fuselage in position to shield said wheel from air currents, and a lifting aerofoil supported solely from said shield and extending laterally therefrom.

9. In an aircraft in combination, a fuselage, a wind shield associated with said fuselage, said shield comprising a fixed portion and a movable portion, said portions adapted to enclose a part to be shielded from air currents, and a lifting aerofoil mounted on said fixed portion.

10. In an aircraft in combination, a fuselage, a retractible landing gear pivotally associated with said aircraft and having a ground wheel, means for folding said landing gear adjacent to said fuselage, a wind shield associated with said aircraft and mounted on said fuselage in position to receive said wheel in its retracted position, and a lifting aerofoil supported solely on said shield in position to extend laterally therefrom.

11. In an aircraft in combination, a retractible landing gear comprising a vertical support bar, a transverse support for said bar, a cap on the upper end of said bar, a pivotal connection between the bar and cap, there being complementary recesses on said bar and cap arranged to surround said transverse support, and means for locking said cap to said bar for detachably engaging said support.

In testimony whereof I affix my signature.

ARTHUR ABNER REID.